US006895133B1

United States Patent
Calkins et al.

(10) Patent No.: US 6,895,133 B1
(45) Date of Patent: May 17, 2005

(54) CRACK PROPAGATION STOPS FOR DICING OF PLANAR LIGHTWAVE CIRCUIT DEVICES

(75) Inventors: Chris P. Calkins, San Jose, CA (US); Robert Cole, Mt. Hamilton, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 159 days.

(21) Appl. No.: 09/885,627

(22) Filed: Jun. 20, 2001

(51) Int. Cl.$^7$ ................................................ G02B 6/12
(52) U.S. Cl. ............................ 385/14; 385/15; 385/129
(58) Field of Search ............................ 385/14, 15, 129

(56) References Cited

U.S. PATENT DOCUMENTS

| | | | |
|---|---|---|---|
| 4,610,079 A | * | 9/1986 | Abe et al. ...................... 29/583 |
| 5,447,585 A | | 9/1995 | Dannoux et al. .............. 156/64 |
| 5,789,302 A | * | 8/1998 | Mitwalsky et al. ......... 438/462 |
| 5,872,883 A | | 2/1999 | Ohba et al. .................. 385/129 |
| 5,926,586 A | | 7/1999 | Dragone et al. .............. 385/14 |
| 6,219,471 B1 | | 4/2001 | Doerr .......................... 385/15 |
| 6,407,360 B1 | * | 6/2002 | Choo et al. ............ 219/121.67 |
| 6,495,918 B1 | * | 12/2002 | Brintzinger ................. 257/758 |

* cited by examiner

Primary Examiner—John D. Lee
Assistant Examiner—Sung Pak
(74) Attorney, Agent, or Firm—Amin & Turocy, LLP

(57) ABSTRACT

One aspect of the present invention relates to a method of dicing a substrate containing a plurality of non-rectangular shaped optical integrated circuits, involving forming stop cracks in the wafer, each stop crack adjacent and substantially parallel one of the non-rectangular shaped optical integrated circuits, and cutting the substrate in a curvilinear manner substantially parallel to a stop crack. Another aspect of the present invention relates to an optical structure containing a substrate; a plurality of non-rectangular shaped optical integrated circuits on the substrate, each non-rectangular shaped optical integrated circuit having an active region; and at least one stop crack positioned adjacent each non-rectangular shaped optical integrated circuit.

15 Claims, 2 Drawing Sheets

CRACK PROPAGATION STOPS FOR DICING OF PLANAR LIGHTWAVE CIRCUIT DEVICES

FIELD OF THE INVENTION

The present invention generally relates to fabricating and dicing optical integrated circuits. In particular, the present invention relates to efficiently isolating optical integrated circuits with high yields from substrates.

BACKGROUND OF THE INVENTION

Planar lightwave circuits (PLCs) are optical circuits laid out on a silicon wafer. PLCs, which typically contain one or more planar waveguides often used in arrayed waveguide gratings, are used as components in constructing an optical communication system. Optical communication systems permit the transmission of large quantities of information. With ever increasing internet traffic, greater demands are placed on optical communication systems, and their corresponding components.

A plurality of optical integrated circuits (OICs) including PLCs are typically fabricated on a single substrate or wafer. For example, a substrate may be fabricated with 30 to 40 OICs thereon. Individual OICs are isolated using a specialized saw to dice the substrate. However, OICs have a regular (consistent), non-rectangular geometry. Straight-line dicing using a saw consequently leads to the inefficient isolation of individual OICs from a substrate. Referring to FIG. 1, a substrate 100 with a plurality of PLCs 102 thereon is shown. Referring to FIG. 2, when individual PLCs 102 are isolated from the substrate 100 using a saw (square dicing), several PLCs 104 are destroyed while only one PLC 106 is recovered. Often times, two to four PLCs are destroyed for each PLC that is recovered.

There have been attempts to realize increased yields of OICs from optical component substrates using laser cutting techniques and water jet stream cutting techniques. These techniques are attractive because they in theory permit curvilinear cutting of non-rectangular shapes is possible.

Referring to FIG. 3, an OIC 120 diced using curvilinear cutting from a substrate containing a plurality of OICs thereon is shown (such as from the substrate shown in FIG. 1). Unfortunately, an OIC 110 cut in a curvilinear manner from a substrate often undesirably contains cracks 112 and chips 114. Such cracks 112 and chips 114 often constitute in fatal defects in the OIC 120 since the cracks 112 and chips 114 inhibit reliable operation of the optical components formed on the OIC.

Moreover, unlike machining metal substrates, OIC substrates and the components thereon are often made of monocrystalline silicon, silicon dioxide, various oxides and silicates, and other materials that are very brittle by nature. The brittle nature of such materials facilitates the formation of cracks and chips in the substrate or the components thereon during cutting. Thus, the propensity to form cracks and chips during curvilinear cutting in combination with the brittle nature of the OIC substrates leads to the low yield of OICs from OIC substrates. And since a plurality of OICs are fabricated in close proximity to one another, even small chips and cracks can render the OICs fatally defective.

There is an unmet need in the to art to improve the current yields of OICs/PLCs from substrates, and particularly to mitigate cracking and chipping when dicing the substrates containing a plurality of OICs/PLCs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides methods and OICs for facilitating curvilinear cutting of OICs substrate with high yield. The present invention provides methods and OICs for facilitating curvilinear cutting of OIC substrates while mitigating or eliminating edge chipping, cracking, and other degrading effects. In particular, providing waveguide stop cracks improves the cut quality of OICs. As a result, the present invention maximizes the yield of non-rectangular OICs from a single substrate. The present invention also correspondingly promotes maximizing the number of non-rectangular OICs that may be fabricated on a single substrate since isolation thereof in high yield is enabled.

One aspect of the invention relates to a method of increasing optical integrated circuit yield per wafer, involving providing a wafer with a plurality of non-rectangular shaped optical integrated circuits; forming stop cracks in the wafer, each stop crack adjacent one of the non-rectangular shaped optical integrated circuits; cutting the wafer in a curvilinear manner to yield a plurality of separated non-rectangular shaped optical integrated circuits.

Another aspect of the present invention relates to a method of dicing a substrate containing a plurality of non-rectangular shaped optical integrated circuits, involving forming stop cracks in the wafer, each stop crack adjacent and substantially parallel one of the non-rectangular shaped optical integrated circuits, and cutting the substrate in a curvilinear manner substantially parallel to a stop crack.

Yet another aspect of the present invention relates to an optical structure containing a substrate; a plurality of non-rectangular shaped optical integrated circuits on the substrate, each non-rectangular shaped optical integrated circuit having an active region; and at least one stop crack positioned adjacent each non-rectangular shaped optical integrated circuit.

Still yet another aspect of the invention relates to an optical integrated circuit containing a substrate having two curvilinear longitudinal edges, a non-rectangular shaped active region containing optical components, and at least one stop crack positioned substantially parallel and proximate one of the curvilinear longitudinal edges.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
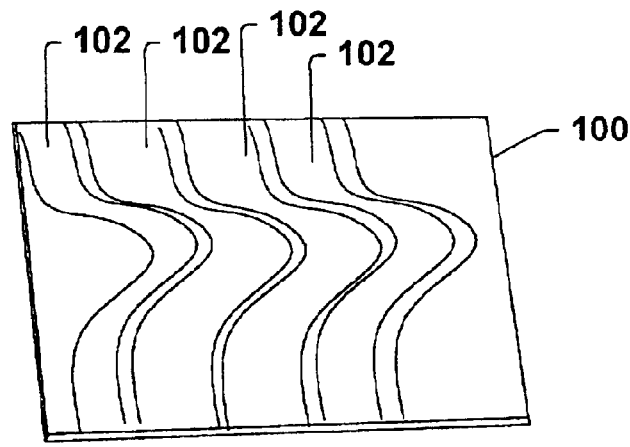
FIG. 1 illustrates a topdown view of an OIC substrate with a plurality of OICs thereon.
Figure 2:
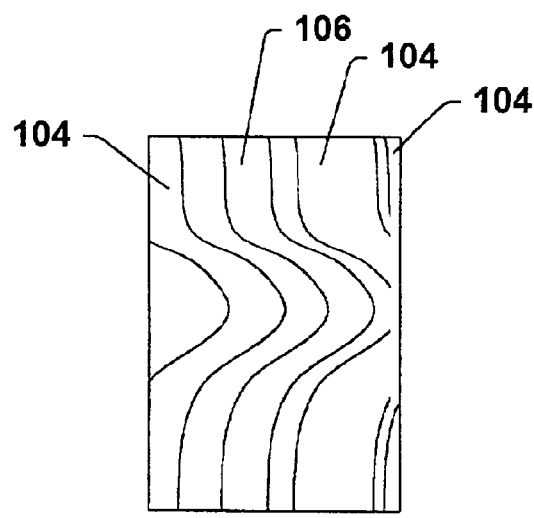
FIG. 2 illustrates a conventional manner of cutting an OIC substrate.
Figure 3:
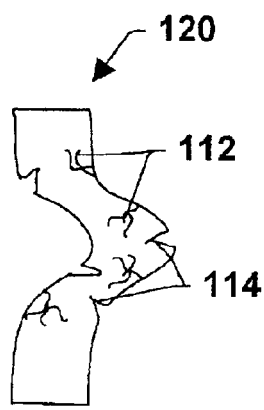
FIG. 3 illustrates problems with cutting an OIC substrate.
Figure 4:
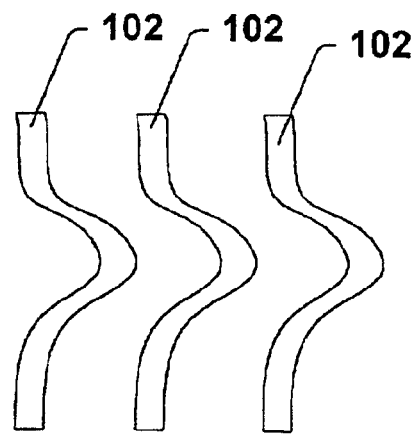
FIG. 4 illustrates OICs diced in accordance with one aspect of the present invention.

The present invention involves forming stop cracks in an OIC substrate to facilitate curvilinear cutting of the OICs from a brittle substrate while minimizing/controlling chipping and cracking of the OIC and substrate. Referring again to FIG. 1, a substrate 100 with a plurality of PLCs 102 thereon is shown. Referring now to FIG. 4, all or substantially all of the individual PLCs 102 may be cut and isolated from the substrate 100 with high yield. Curvilinear cutting between stop cracks is conducted to separate the non-rectangular shaped optical devices from each other while mitigating damage to the active region of the OICs.

Figure 5:
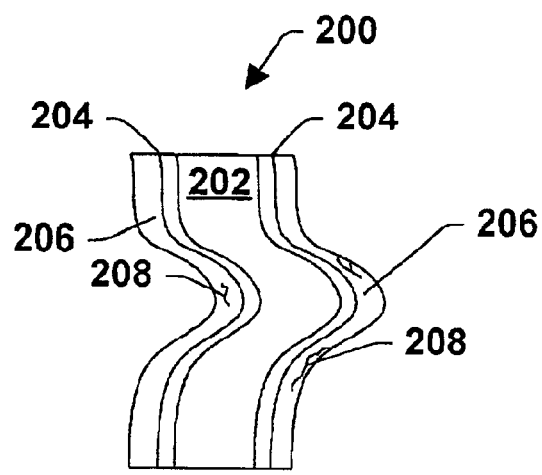
FIG. 5 illustrates an OIC diced in accordance with one aspect of the present invention.

Referring to FIG. 5, an OIC 200 in accordance with one aspect of the present invention is shown. OIC 200 is non-rectangular in shape and has active region 202 where various optical components are positioned (such as lenses, taps, optical ports, waveguides, multiplexers, demultiplexers, AWGs, and the like), at least one and preferably two waveguide stop cracks 204 positioned substantially parallel with the longitudinal edge of the OIC, and sacrificial regions 206 positioned between the longitudinal edge and the waveguide stop cracks 204. The stop cracks 204 are positioned not only substantially parallel with the longitudinal edge of the OIC 200, but also proximate the longitudinal edge of the OIC 200 to facilitate increased integration (maximizing the number of OICs formed on a given substrate). Although only one OIC is shown, typically a substrate is fabricated with about 2 to about 50 OICs thereon.

The presence of the waveguide stop cracks 204 reduces the propensity of cracks 208 and chips from degrading the active region 202 of the OIC 200. In other words, cracks 208 and chips created by curvilinear dicing do not spread out of the sacrificial regions 206 into the active region 202 of the OIC 200 because the stop cracks 204 contain and/or isolate the cutting induced defects to the sacrificial regions 206.

The substrates with OICs thereon that are cut in accordance with the present invention are made, at least in part, with brittle materials such as silica, monocrystalline silicon, silicon oxynitride, silicate glasses such as tetraethylorthosilicate (TEOS), organic/polymeric materials, and the like. Other silicate glasses include phosphosilicate glass (PSG), fluorosilicate glass (FSG), borophosphosilicate glass (BPSG) and borophosphotetraethylorthosilicate (BPTEOS). The brittle nature makes the substrates and/or the OICs thereon readily susceptible to cracking and chipping, which often constitute fatal defects in the OICs (or substantially reduces the performance and/or reliability of the OICs).

The shape of the OICs on a given substrate is typically non-rectangular, but regular. Referring again to FIG. 1, a substrate with a plurality of OICs, in the case PLCs, is shown. When the shape of OICs is regular or consistent (substantially the same), they may be nested on the substrate to maximize the number of OICs fabricated on a given substrate. However, in order to maximize yield, curvilinear cutting must be employed. The present invention permits curvilinear (a line that is curved, not straight) cutting of brittle materials.

The stop crack is made in any suitable manner. For example, the crack may be formed using a saw, a milling machine, a laser, a water jet, or chemical etching. The stop cracks are made on the OICs at any time prior to dicing. In this connection, the stop cracks may be formed before, during or after optical components are provided in the active regions of the substrate. The stop crack may remain empty after formation, or a material may be formed within the crack, such as providing silicon dioxide or other dielectric material in the crack. The stop crack may thus be a trench or a layer of a stop crack material.

The width of the stop crack is effective to deflect or prevent cracks and/or chips due to curvilinear cutting from propagating into the active region of the OIC. In one embodiment, the width of the stop crack is about 1 micron or more and about 1 mm or less. In another embodiment, the width of the stop crack is about 10 microns or more and about 0.5 mm or less. In yet another embodiment, the width of the stop crack is about 25 microns or more and about 0.25 mm or less.

The depth of the stop crack is effective to deflect or prevent cracks and/or chips due to curvilinear cutting from propagating into the active region of the OIC. In one embodiment, the depth of the stop crack is at least about 5% of the thickness of the OIC. In another embodiment, the depth of the stop crack is at least about 10% of the thickness of the OIC. In yet another embodiment, the depth of the stop crack is at least about 25% of the thickness of the OIC.

After the stop cracks are formed in the OICs, and after the optical components are formed in the active regions of the OICs, the substrate containing a plurality of non-rectangular OICs is diced using curvilinear cutting to maximize the yield of non-rectangular OICs from the substrate. The substrate is cut by making the incision between stop cracks of adjacent OICs. Preferably, the stop cracks of adjacent OICs are substantially parallel and the cut edge or incision is substantially parallel with the stop cracks. The substrate is diced in a curvilinear manner using any suitable cutting technique. For example, the substrate may be diced using a saw, a milling machine, a laser, or a water jet.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "with", "has", "having", and variants thereof are used in either the detailed description or the claims, these terms are intended to be inclusive in a manner similar to the term "comprising."

What is claimed is:

1. A method of increasing optical integrated circuit yield per wafer, comprising:
   providing a wafer comprising a plurality of non-rectangular shaped optical integrated circuits;
   forming stop cracks in the wafer, each stop crack adjacent one of the non-rectangular shaped optical integrated circuits;
   cutting the wafer in a curvilinear manner to yield a plurality of separated non-rectangular shaped optical integrated circuits.

2. The method according to claim 1, wherein the stop cracks are curvilinear and positioned substantially parallel to the non-rectangular shaped optical integrated circuits.

3. The method according to claim 1, wherein the stop cracks have a width of about 25 microns or more and about 0.25 mm or less.

4. The method according to claim 1, wherein the stop cracks have a depth of at least about 10% of the thickness of the wafer.

5. The method according to claim 1, wherein the stop cracks are formed using one selected from the group consisting of a saw, a milling machine, a laser, a water jet, and chemical etching.

6. The method according to claim 1, wherein the optical integrated circuit is a planar lightwave circuit.

7. The method according to claim 1, wherein cutting is conducted by one selected from the group consisting of laser cutting and water jet cutting.

8. A method of dicing a substrate comprising a plurality of non-rectangular shaped optical integrated circuits, comprising:
   forming stop cracks in the wafer, each stop crack adjacent and substantially parallel one of the non-rectangular shaped optical integrated circuits; and
   cutting the substrate in a curvilinear manner substantially parallel to a stop crack.

9. The method according to claim 8, wherein each non-rectangular shaped optical integrated circuit has two stop cracks adjacent and substantially parallel therewith.

10. The method according to claim 8, wherein the stop cracks are formed using one selected from the group consisting of a saw, a milling machine, a laser, a water jet, and chemical etching.

11. The method according to claim 8, wherein the stop crack has a width of about 10 microns or more and about 0.5 mm or less.

12. The method according to claim 8, further comprising filling the stop crack with a dielectric material prior to cutting the substrate.

13. The method according to claim 8, wherein the cutting is conducted by one selected from the group consisting of laser cutting and water jet cutting.

14. An optical integrated circuit, comprising:
   a substrate comprising two curvilinear longitudinal edges;
   a non-rectangular shaped active region comprising optical components; and
   at least one stop crack positioned substantially parallel and proximate one of the curvilinear longitudinal edges.

15. An optical integrated circuit according to claim 14, comprising two stop cracks, each stop crack positioned substantially parallel and proximate one of the curvilinear longitudinal edges.

* * * * *